UNITED STATES PATENT OFFICE.

FRANZ KÖNITZER, OF ZITTAU, GERMANY.

PROCESS OF DYEING WOOL BLACK.

No. 830,082. Specification of Letters Patent. Patented Sept. 4, 1906.

Application filed October 18, 1904. Serial No. 228,988.

*To all whom it may concern:*

Be it known that I, FRANZ KÖNITZER, manufacturer, a subject of the King of Saxony, and residing at No. 1 Lutherplatz, in Zittau, in the Kingdom of Saxony, German Empire, have invented a new and improved method of dyeing animal fibers and mixtures of animal and vegetable fibers, as well as the goods manufactured thereof, by means of oxidation-black, of which the following is a specification.

In dyeing oxidation-black on fabrics made from animal fibers or from mixtures of animal and vegetable fibers various difficulties present themselves, which are based on the different characters of the two classes of fibers. The methods hitherto known attempt to counteract the reducing properties of the animal fibers, and especially the capacity of the wool for the absorption of acids, either before the actual oxidation-black process by treatment with acids or oxidizing media, or with both combined, or by first treating the material with acid, then dyeing by the oxidation process the cotton alone, (an excess of acid and oxidizing medium being used for this purpose,) and then steaming the wool, or by using instead of hydrochlorid of anilin the ferrocyanid of the same and developing the black color by steaming.

Careful experiments on dyeing black by the anilin oxidation process have shown that the difference between the chemical character of animal fibers and that of vegetable fibers is no longer apparent in dyeing black by the oxidation anilin process, and that consequently animal and vegetable fibers may be padded with the same anilin-black mordant and afterward dyed uniformly black by drying and oxidizing (greening, aging) and subsequent chroming or steaming, it being immaterial whether the two kinds of fibers are dyed separately or in the shape of mixed fabrics, provided that the animal fiber is dyed Prussian blue (Williamson's blue) either before or after the oxidation.

The best way for producing Prussian blue on animal fibers is to apply a bath of potassium ferricyanid and sulfuric acid. The production of a very dark blue is not necessary. Nor will this treatment weaken the vegetable fibers contained in mixtures with animal fibers, provided that no greater quantity of sulfuric acid is used than that necessary for the decomposition of the potassium ferricyanid. Tin salt may be added, but does not offer any advantage. Potassium ferrocyanid may also be used, but the color obtained with it is not so pretty as that obtained with ferricyanid. Instead of potassium salts of hydro-ferricyanic acid or of hydro-ferrocyanic acid other salts of these acids, or the cyanids or cyanurets of manganese and potassium, or of manganese and sodium, or of chromium and potassium, or of chromium and sodium, or of cobalt or nickel, or copper or uranium with potassium or sodium, or sodium nitroprussid or other nitro-prussids may be employed. The action of the Prussian blue has not yet been elucidated, as it seems it does not only act physically to intensify and shade the black color, but it appears to have also chemically a very important action in the process of dyeing by means of oxidation-black. The greening (aging) process takes place in the usual manner, care being taken that the fibers will not become dry, but remain moist. The chroming takes place subsequently in the usual manner. On pure animal fiber the black color may be developed also by steaming. Finally the material is washed and soaped. The treatment of the animal fiber with potassium-ferrocyanid and acid may be performed after (instead of before) the greening (oxidation) process. In either case a fast oxidation-black may be produced.

The anilin salt or anilin-oil may be replaced by equivalent quantities of diphenylamin salt and base or by other organic amins and their salts. These substitutions, however, cause a variation in the shade of black produced by the process.

Having now described my invention, what I desire to secure by a patent of the United States is—

1. The method of producing oxidation-black upon animal fibers, characterized by dyeing the animal fibers blue by means of cyanids and acids before the oxidation-black process, substantially and for the purpose as described.

2. The method of producing oxidation-black upon animal fibers, characterized by dyeing the animal fibers blue by means of cyanids and sulfuric acid before the oxidation-black process, substantially and for the purpose as described.

In witness whereof I have hereunto set my hand in presence of two witnesses.

FRANZ KÖNITZER.

Witnesses:
 GUSTAV TROMMER,
 HERBERT SMITH.